May 9, 1933.  J. D. CUMMINGS ET AL  1,907,934
TRACTOR ATTACHMENT
Filed Dec. 20, 1929    4 Sheets-Sheet 1

Inventor
Jos. D Cummings
M. P. Laurent
By
Jesse R. Stone
Lester B Clark
Attorneys

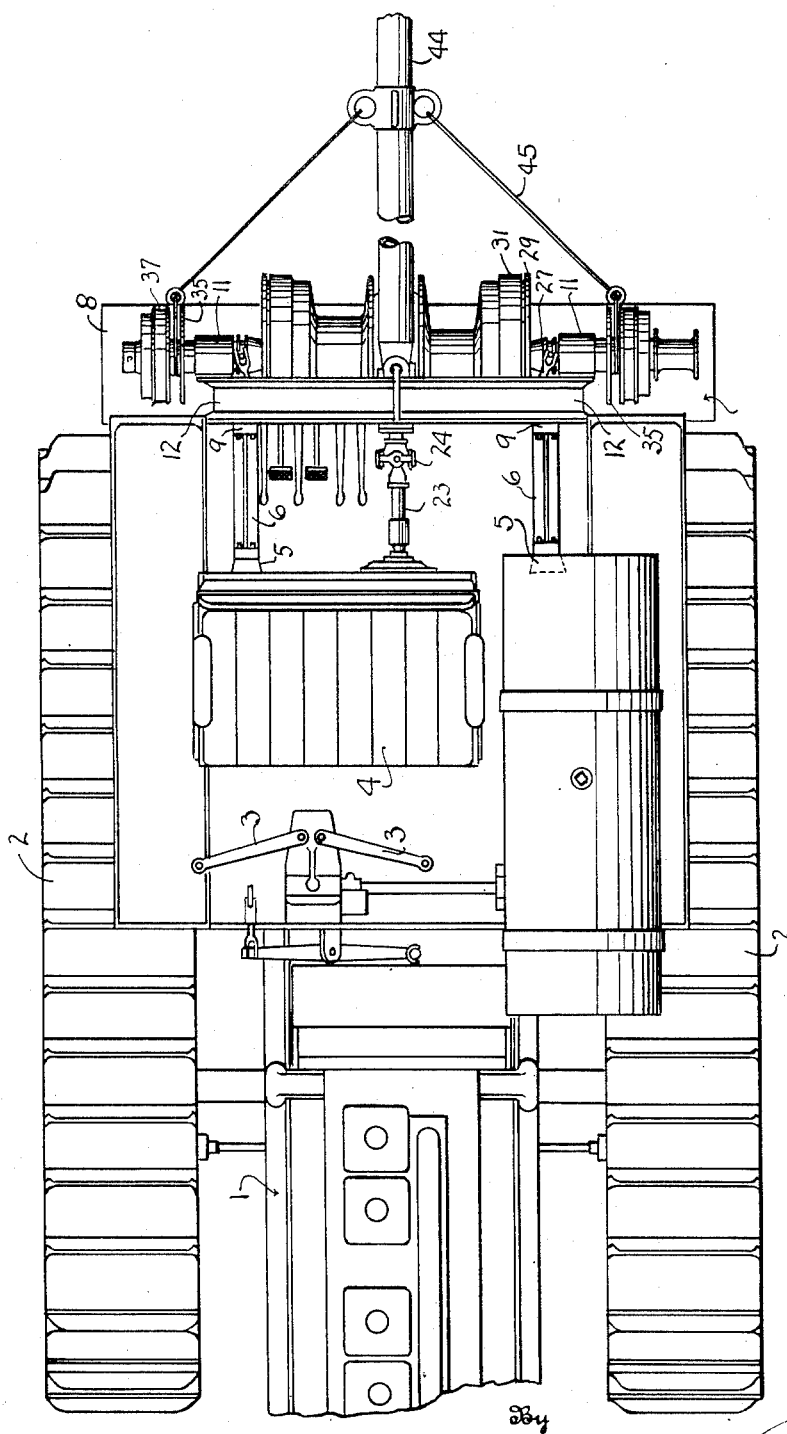

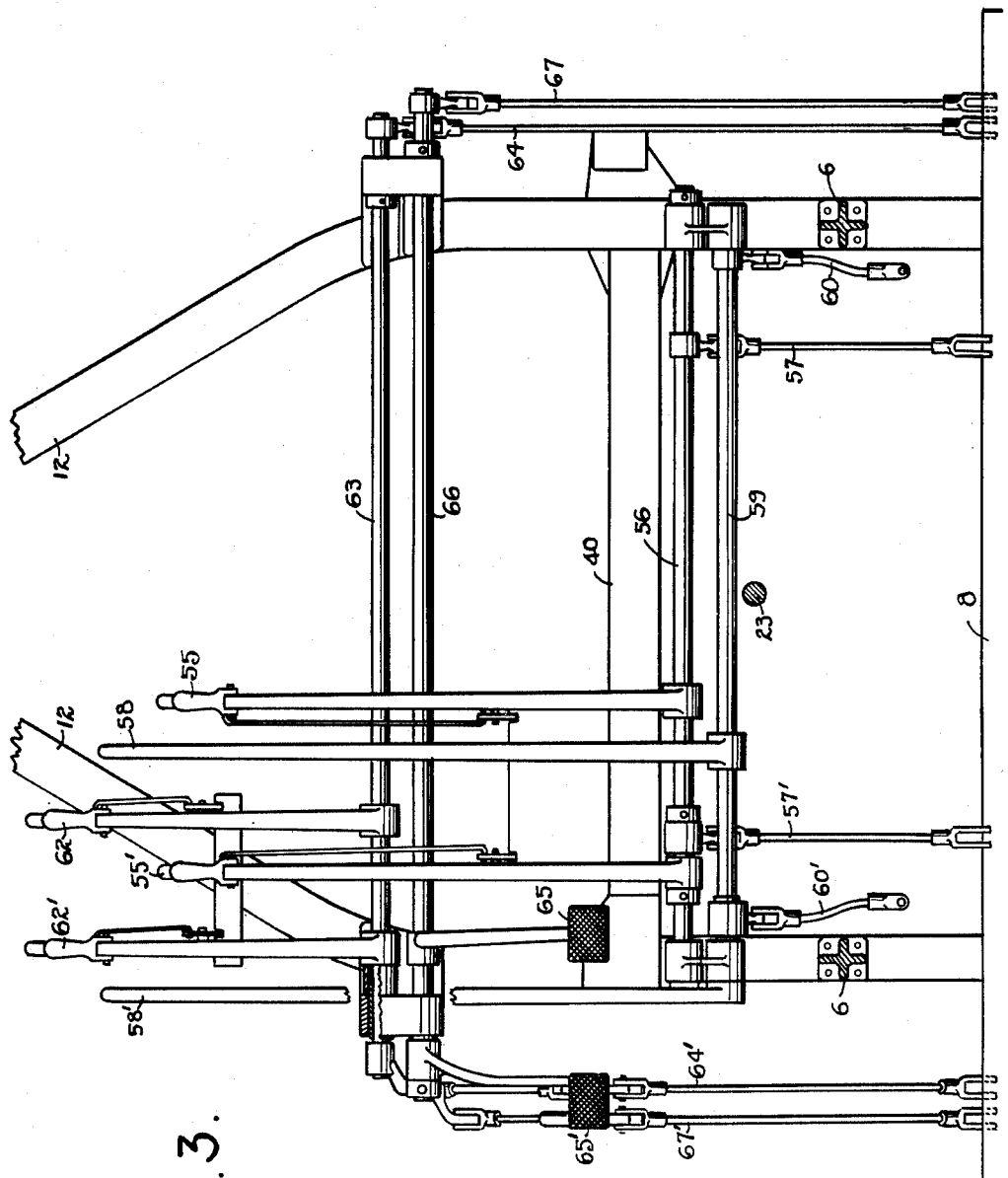

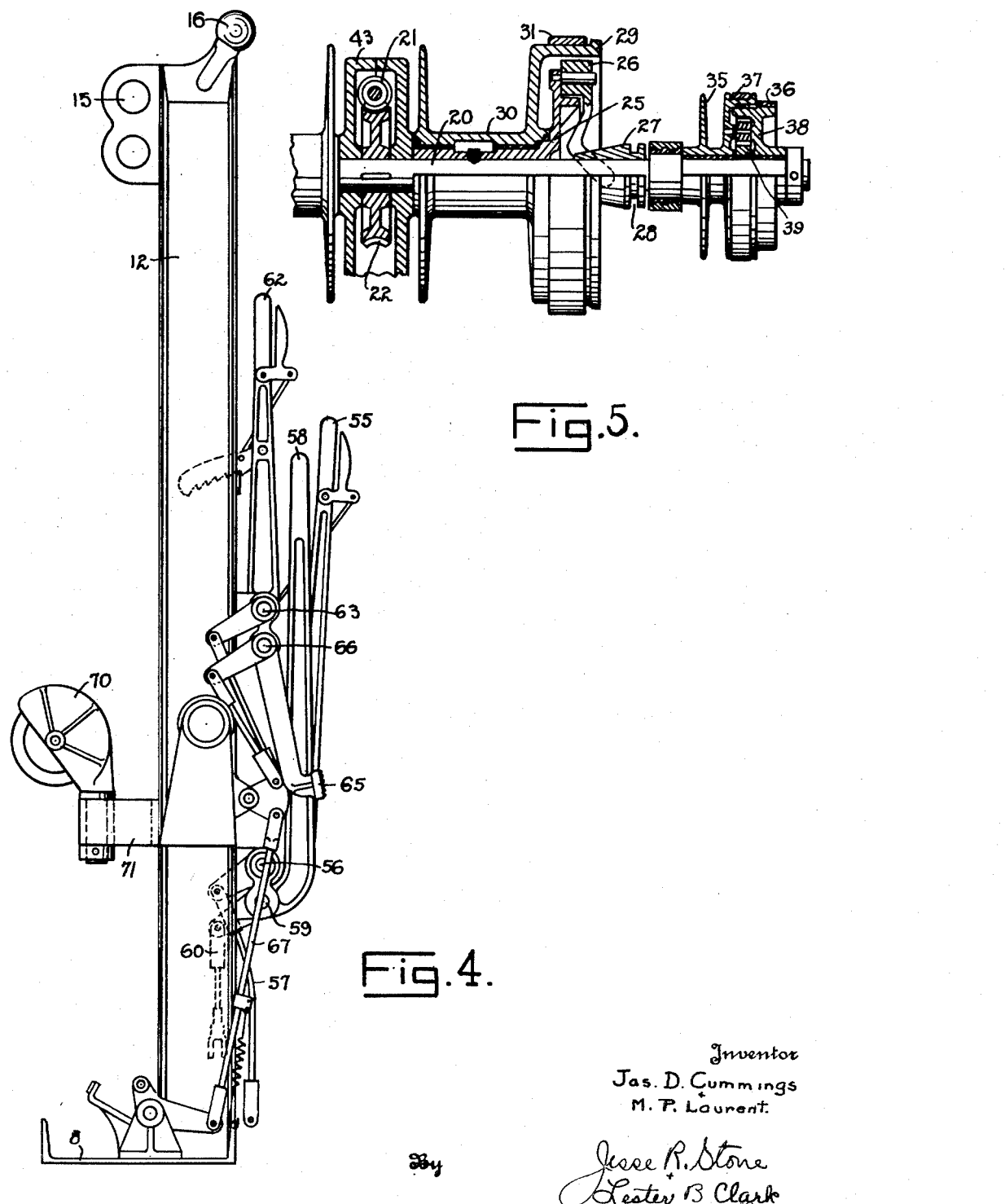

Patented May 9, 1933

1,907,934

UNITED STATES PATENT OFFICE

JAMES D. CUMMINGS AND MILTON P. LAURENT, OF HOUSTON, TEXAS

TRACTOR ATTACHMENT

Application filed December 20, 1929. Serial No. 415,430.

The invention relates to an improvement in attachments for tractors of the crawler type and contemplates utilizing the weight of the tractor as a counterbalance for the load which is to be moved.

It is one of the objects of the invention to provide a combination hoist and boom attachment for tractors of the crawler type wherein the attachment is so arranged with respect to the tractor that the weight of the tractor may be employed to counterbalance the load upon the boom.

Another object of the invention is to arrange the hoist and boom or other attachment transversely with respect to the crawler tracks.

Another object of the invention is to provide extensions for the frame member of the tractor and arrange the hoist so that power may be transmitted thereto directly from the power take off of the tractor.

Still another object of the invention is to arrange the hoist in a position to the rear of the point of contact of the crawler tracks with the supporting surface.

Other and further objects of the invention, such as the simplicity of the driving mechanism and operating devices of the hoist as well as the compact arrangement of the various portions of the structure will be readily apparent to those skilled in the art when the following description is considered in connection with the accompanying drawings wherein:

Fig. 2 is a top plan view of the tractor shown in Fig. 1 and illustrating the arrangement of our improvement with respect to the crawler tracks and driving mechanism of the tractor.

Fig. 3 is a diagrammatic view showing the arrangement of the control levers for the hoists, brakes and clutches.

Fig. 4 is a side elevation showing in detail the arrangement of the operating lever illustrated in Fig. 3.

Fig. 5 is a detail view of certain portions in section of a portion of the hoist, the clutch, the brake and the driving mechanism therefor, as well as the planetary drive for the boom swinging reel.

Figure 1:
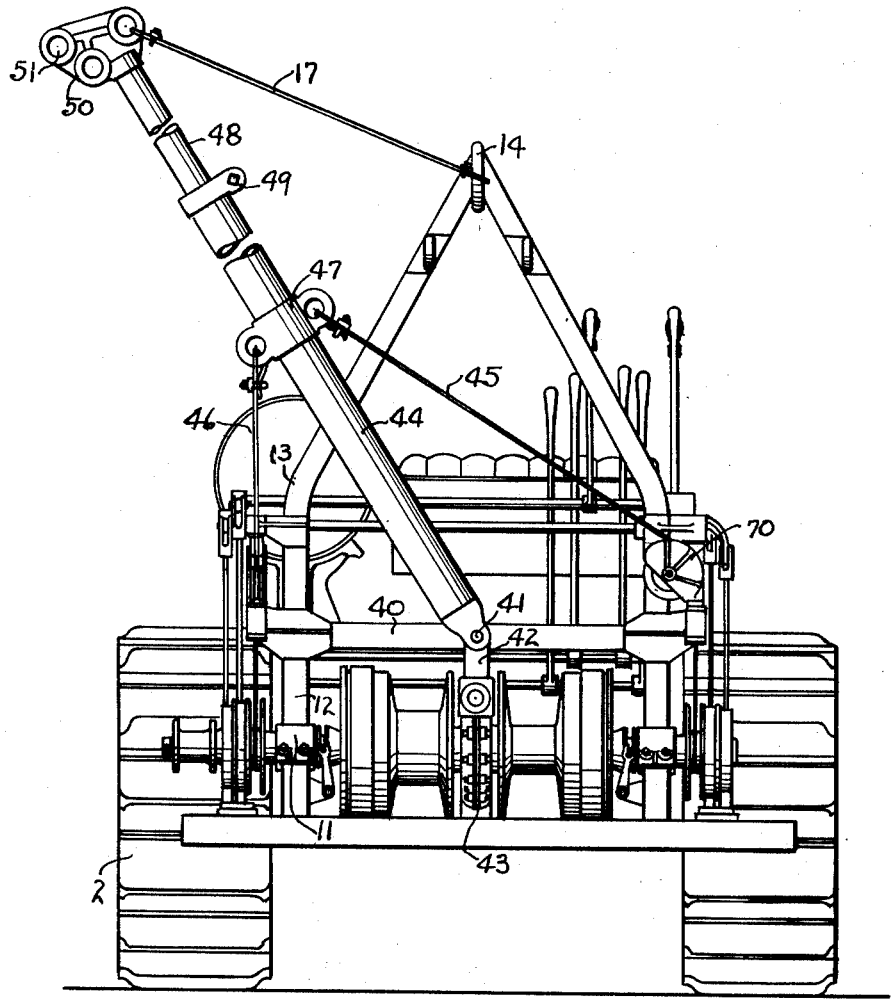
Fig. 1 is a rear elevation of a crawler type tractor equipped with our improvements.

A tractor of a type generally in use is illustrated by the reference character 1. Such tractors are driven by an internal combustion engine and are propelled by means of endless tracks indicated at 2, the operation of these tracks being controlled by means of the levers 3 from the operator's seat 4. The various portions of the tractor are mounted upon a frame work constituting longitudinal and cross beams. These beams, however, terminate at a point on the rear end of the tractor adjacent the driver's seat and are best seen in Fig. 2 at 5. In order to provide an arrangement whereby our improvement may be connected to the tractor we have devised frame extension members 6. These members extend outwardly from the frame 5 of the tractor and are of a length such as to project slightly beyond the rear end of the crawler tracks. Fig. 3 shows a sectional view of these extension members and while they have been illustrated as a cross when viewed in transverse section it is to be understood that any desired construction may be used in order to obtain a rigid support for the hoist and boom.

It is contemplated that the hoist or other device will be mounted upon a channel or other member 8, which is connected at 9 with the frame extensions 6. This plate or channel 8 extends transversely at the rear of the tractor and slightly beyond the rearmost portion of the tracks 2. As seen in Figs. 1 and 4 both the boom and the hoist are mounted upon this channel, and it is to be understood that it will accommodate any type of operative device. The hoist is supported with respect to the plate by means of bearings 11, which may be mounted directly on the plate 8 or they may be connected with the uprights 12 of the boom anchor. These two uprights extend vertically from the channel 8 and have their lower ends resting thereon. The uprights, as seen in Fig. 1, are curved inwardly at 13 and are joined at 14 by a connecting plate. Any desired form of connection may be arranged for these two uprights and in Fig. 4 a plate provided with a pair of openings 15 and ball connection 16 has been illustrated. In this manner any type of device may be connected to this anchor member. Fig. 1 shows the stay cable 17 as connected through one of the openings 15.

The hoist comprises a main shaft 20 adapted to be driven by means of a worm 21 and gear 22, the worm 21 being mounted on an extension drive shaft 23 which may or may not be provided with a universal joint 24. It should be noted that this drive shaft extension 23 is a direct extension of the drive shaft from the power take off of the tractor and any transmission arrangement which is on the tractor is also available for use in obtaining various speeds upon the hoist.

The shaft 20 is adapted for rotation and has keyed thereto a driving member 25 which carries a pair of friction shoes. These shoes are similar to the usual brake shoe and are adapted to be expanded by cams 26, which are in turn operated by a cone 27. The cone 27 is provided with an annular groove 28 in which an operating arm is adapted to engage. Thus by longitudinal movement of the cone 27 the cams 26 will be rotated to press the friction shoes against the rim 29 of the hoist drum 30 and impart rotation thereto. A brake band 31 is illustrated as encircling the rim 29 in order that braking action may be applied to the hoist when desired.

The main shaft 20 beyond the cone 27 carries a reel 35 for the swing cable 45 on the boom. The reel 35 is driven by a planetary gearing 36 of well known construction and by tightening of the band 38 this gearing 36 will rotate on the inside of the ring 39. The brake band 37 may be applied to the reel 35, the operation of which will be later described. The foregoing description has been directed to one-half of the hoist and boom control reel, the opposite side being identical therewith. It is not believed that duplicate description thereof is necessary.

The housing 43 of the driving mechanism carries a pivot bracket, which is integral with the housing and in which the boom pivot 42 rotates. The boom 44 is connected to said pivot 42 by means of a pivot pin 41 and is here illustrated as extending upwardly and rearwardly therefrom. The boom control or swing cables 45 and 46 are connected to the right and left reels 35 so that the boom may be moved laterally as desired by operation of the proper lever. These control cables 45 and 46 are shown as connected to the collar 47, which is carried by the boom 44.

The boom has been illustrated as of the extension type wherein the extension 48 is adapted to telescope within the main member 44. The telescoping action is controlled by means of a clamp 49. A boom head 50 is carried by the extension 48 and may be formed in any desired manner, either to accommodate a block and tackle or to receive any other type of construction which it may be found necessary to employ. To receive such equipment the openings 51 have been provided. The stay cable 17 is shown as connected in one of these openings and serves to retain the boom at any desired elevation. It is obvious that this stay cable may be passed over a sheave connected to the plate 14 and then passed downward to one of the reels of the hoist so that the boom may be raised or lowered if desired. For purpose of illustration, however, the boom has merely been shown as retained in elevated position by the stay cable.

The arrangement of the various levers and pedals for operating the hoist, clutches, brakes and cable reels are best seen in rear elevation in Fig. 3 and in side elevation in Fig. 4.

For purposes of convenience the arrangement of the levers will be described with respect to the tractor when it is considered that they are arranged in accordance with the assembly illustrated in Fig. 2. The hoist 30 and the reel 35 will therefore be considered as the right hand hoist and reel, whereas the two which are not illustrated in Fig. 5 and are on the opposite side will be considered left hand hoist and reel.

The lever 55 is mounted upon a shaft 56 which has the rod 57 linked thereto. This rod 57 leads to the right hand brake band 31. The lever 58 is mounted upon the shaft 59 and has connected therewith the rod 60 which leads to the right hand clutch 27. These two levers serve to control the movement of the hoist drum 30. The lever 62 is mounted on a shaft 63 and has connected therewith a rod 64 which serves to control the brake band 37 of the right hand reel 35. The pedal 65 is mounted on a shaft 66 and has connected therewith the rod 67, which controls the right clutch band 36, which operates the right reel 35. The levers 55' 58' and 62' and the pedal 65' operate the left hand brake, clutch, reel brake and reel clutch band respectively; the same as the right hand levers indicated by the same reference characters. It will be seen from this arrangement that a compact assembly has been provided so that the operator may readily control the lateral swinging movement of the boom and the reeling and unreeling of the hoist cables.

A sheave 70 is shown as mounted on a bracket 71, which is carried by the uprights 12. One of these sheaves is arranged on each of the uprights 12 and are adapted to receive the swing cables 45 and 46 in order that the cable will be guided directly onto each of the right and left hand reels.

With the construction of a hoist and boom in accordance with the foregoing description it seems apparent that the point of application of the weight on the boom will be at the pivot 41. This weight will therefore be applied at a point to the rear of the center of gravity of the tractor and in fact to the rear of any point of contact of the tracks 2 with the earth's surface or other supporting surface on which the tractor might be. This is one of the particular advantages of the present construction as in use of a hoist and a boom of the type here illustrated enormous loads are sometimes to be moved by the boom and unless a considerable weight may be utilized as a counterbalance the tractor may be overturned. With the present construction, however, the entire weight of the tractor may be used as a counterbalance as the fulcrum for the weight upon the boom will be the rearmost point of contact of the tracks 2 with the earth's surface. It should also be noted that the greatest weight of the tractor, viz, the engine thereof, is mounted at the greatest distance from the point about which the tractor will balance. This arrangement will give an enormous balancing weight which thereby increases the load which may be carried by the boom. It is understood that tractors of the type here illustrated are very heavy in their construction and it has been found in practice with the present arrangement that enormous loads may be handled by the construction here described. Another feature to be noted is the simplicity of the driving connection for the hoist. It consists of merely an extension of the driving shaft of the tractor and eliminates all sprockets, chains and similar cumbersome structures which have heretofore been employed.

While the invention has been described particularly for accommodation of a hoist and boom in combination with the frame attachment it is contemplated that other auxiliary mechanisms may be mounted on the frame 8. Thus it may be desirable to mount a concrete mixer, a welding machine or some other type of apparatus on the frame so that it may be transported or operated by the power of the tractor. We therefore, intend that the invention may assume various forms and modifications without departing from the spirit of the appended claims.

Having described our invention what we claim as new is:

1. In combination, a crawler type tractor and a hoist and boom attachment, means to connect said attachment to said tractor whereby the weight of the tractor will act as a counter balance and fulcrum about the rearmost point of contact of the crawlers with the supporting surface, said means including frame extension members connected to the tractor frame, a support beam for said hoist and boom arranged transversely of said tractor, uprights disposed on said support beam and connected to said extension members, and control means for said hoist and boom mounted on said beam and said uprights.

2. An attachment for crawler type tractors including a frame, means to connect said frame to the tractor transversely thereof and to the rear of the crawler tracks, a boom pivoted on said frame, uprights forming part of said frame and serving as a mast for said boom, and means on said frame to manipulate said boom and a load thereon.

3. An attachment for tractors including a frame adapted to support a hoist and boom, means to connect said frame to one end of said tractor, said frame comprising a transverse member and spaced upright members, a brace between said upright members, and guide pulleys pivoted to said uprights.

In testimony whereof we hereunto affix our signatures this the 13th day of December, A. D. 1929.

JAMES D. CUMMINGS.
MILTON P. LAURENT.